United States Patent
Seo et al.

(10) Patent No.: US 10,827,446 B2
(45) Date of Patent: Nov. 3, 2020

(54) METHOD FOR TRANSMITTING SYNCHRONIZATION SIGNAL IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 15/329,189

(22) PCT Filed: Aug. 5, 2015

(86) PCT No.: PCT/KR2015/008203
§ 371 (c)(1),
(2) Date: Jan. 25, 2017

(87) PCT Pub. No.: WO2016/024754
PCT Pub. Date: Feb. 18, 2016

(65) Prior Publication Data
US 2017/0215161 A1   Jul. 27, 2017

Related U.S. Application Data

(60) Provisional application No. 62/036,105, filed on Aug. 11, 2014, provisional application No. 62/045,543, filed on Sep. 3, 2014.

(51) Int. Cl.
*H04W 4/00* (2018.01)
*H04W 56/00* (2009.01)
(Continued)

(52) U.S. Cl.
CPC .......... *H04W 56/002* (2013.01); *H04J 11/00* (2013.01); *H04W 52/383* (2013.01);
(Continued)

(58) Field of Classification Search
CPC .......... H04W 72/042; H04W 72/0453; H04W 72/0446; H04W 72/0413; H04L 5/0048
See application file for complete search history.

(56) References Cited

U.S. PATENT DOCUMENTS

2010/0135257 A1   6/2010   Higuchi et al.
2010/0291925 A1   11/2010  Nagata et al.
(Continued)

FOREIGN PATENT DOCUMENTS

CN   101820321 A   9/2010
CN   102209377 A   10/2011
(Continued)

OTHER PUBLICATIONS

3GPP TSG RAN WG1 Meeting #77 Seoul, Korea, May 19-23, 2014, R1-142340.*
(Continued)

*Primary Examiner* — Atique Ahmed
(74) *Attorney, Agent, or Firm* — Birch, Stewart, Kolasch & Birch, LLP

(57) ABSTRACT

An embodiment of the present invention relates to a method for transmitting a synchronization signal in a wireless communication system. The method comprises: a step of generating a secondary synchronization signal from a combination of two sequences; and a step of transmitting the synchronization signal. The manner of combination of the two sequences varies depending on the sub-frame number to which the secondary synchronization signal is transmitted, and if the generation of the secondary synchronization signal is performed by a terminal, then the sub-frame number which determines the manner of combination is considered to be the same.

11 Claims, 7 Drawing Sheets

(51) Int. Cl.
*H04J 11/00* (2006.01)
*H04W 76/14* (2018.01)
*H04W 52/38* (2009.01)
*H04W 72/04* (2009.01)

(52) U.S. Cl.
CPC ....... *H04W 56/00* (2013.01); *H04W 72/0446* (2013.01); *H04W 76/14* (2018.02); *Y02D 70/00* (2018.01)

(56) References Cited

U.S. PATENT DOCUMENTS

| | | |
|---|---|---|
| 2011/0002430 A1 | 1/2011 | Kim et al. |
| 2011/0044159 A1 | 2/2011 | Kishiyama et al. |
| 2011/0188558 A1 | 8/2011 | Nagata et al. |
| 2013/0142291 A1* | 6/2013 | Dinan .................. H04L 5/0053 375/343 |
| 2013/0176991 A1* | 7/2013 | Yi ......................... H04W 56/00 370/336 |
| 2014/0219270 A1* | 8/2014 | Ro ........................ H04W 56/00 370/350 |
| 2015/0043545 A1* | 2/2015 | Cheng ................ H04L 27/2613 370/336 |
| 2015/0264588 A1* | 9/2015 | Li ..................... H04W 56/0015 370/350 |
| 2016/0044618 A1* | 2/2016 | Sheng ................. H04W 56/002 370/329 |
| 2016/0255597 A1* | 9/2016 | Zhao .................. H04W 52/383 455/522 |
| 2017/0245225 A1* | 8/2017 | Zhu .................. H04W 56/0015 |

FOREIGN PATENT DOCUMENTS

| | | |
|---|---|---|
| CN | 102377712 A | 3/2012 |
| JP | 2013-529416 A | 7/2013 |
| WO | WO 2009/014356 A1 | 1/2009 |
| WO | WO 2011/054905 A1 | 5/2011 |

OTHER PUBLICATIONS

3GPP TSG RAN WG1 Meeting #77 Seoul, Korea, May 19-23, 2014, R1-142340 (Year: 2014).*

3GPP TSG RAN WG1 Meeting #77 Seoul, Korea, May 19-23, 2014, R1-142340 hereinafter 3GPP (Year: 2014).*

Ericsson, "Synchronization Signals Design for D2D," R1-143370, 3GPP TSG-RAN WG1 Meeting #78, Dresden, Germany, Aug. 18-22, 2014, pp. 1-5.

Huawei et al., "D2DSS design," R1-142340, 3GPP TSG RAN WG1 Meeting #77, Seoul, Korea, May 19-23, 2014, 11 pages.

Alcatel-Lucent Shanghai Bell et al., "Resource Allocation and Design for D2D Synchronization Signals," 3GPP TSG RAN WG1 Meeting #78, R1-143024, Dresden, Germany, Aug. 18-22, 2014, 8 pages.

Samsung, "Resource Allocation for Synchronization Signal to Assist D2D Discovery/Communication in Asynchronous Network," 3GPP TSG RAN WG1 #78, R1-143097, Dresden, Germany, Aug. 18-22, 2014, pp. 1-5.

* cited by examiner (a)

(b)

(a)

(b)

METHOD FOR TRANSMITTING SYNCHRONIZATION SIGNAL IN WIRELESS COMMUNICATION SYSTEM

CROSS REFERENCE TO RELATED APPLICATIONS

This application is the National Phase of PCT International Application No. PCT/KR2015/008203, filed on Aug. 5, 2015, which claims priority under 35 U.S.C. 119(e) to U.S. Provisional Application No. 62/036,105, filed on Aug. 11, 2014 and 62/045,543, filed on Sep. 3, 2014, all of which are hereby expressly incorporated by reference into the present application.

TECHNICAL FIELD

The following description relates to a wireless communication system and, more particularly, to a method and apparatus for generating and transmitting a synchronization signal in device-to-device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention devised to solve the problem lies in a method and apparatus for generating and transmitting a synchronization signal in order to solve a peak-to-average power ratio (PAPR) problem.

The technical problems solved by the present invention are not limited to the above technical problems and other technical problems which are not described herein will become apparent to those skilled in the art from the following description.

Technical Solution

According to a first aspect of the present invention, provided therein is a method of transmitting a synchronization signal in a wireless communication system including generating a secondary synchronization signal from a combination of two sequences and transmitting the synchronization signal, wherein a combination type of the two sequences is changed according to a subframe index of a subframe on which the secondary synchronization signal is transmitted, and wherein, when the secondary synchronization signal is generated by a user equipment (UE), the subframe index determining the combination type is regarded as being the same.

In a second aspect of the present invention, provided herein is a user equipment (UE) apparatus for transmitting a synchronization signal in a wireless communication system including a transmission module and a processor, wherein the processor generates a secondary synchronization signal from a combination of two sequences and transmits the synchronization signal, wherein a combination type of the two sequences is changed according to a subframe index of a subframe on which the secondary synchronization signal is transmitted, and wherein, when the secondary synchronization signal is generated by a user equipment (UE), the subframe index determining the combination type is regarded as being the same.

The first and second aspects may include some or all of the followings.

The subframe index regarded as being the same may be 0.

If the subframe index determining the combination type is regarded as being the same, the generated secondary synchronization signal may be transmitted on contiguous symbols.

The contiguous symbols may be present on a $0^{th}$ subframe.

Maximum power reduction for the secondary synchronization signal may be applied to transmission of the secondary synchronization signal generated by the UE.

Maximum transmit power of the secondary synchronization signal may be determined by applying the maximum power reduction for the secondary synchronization signal to transmit power of a primary synchronization signal.

The power reduction may be differently applied per UE.

Advantageous Effects

According to the present invention, it is possible to achieve power efficiency in transmission and detection of a synchronization signal.

The effects which can be obtained by the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
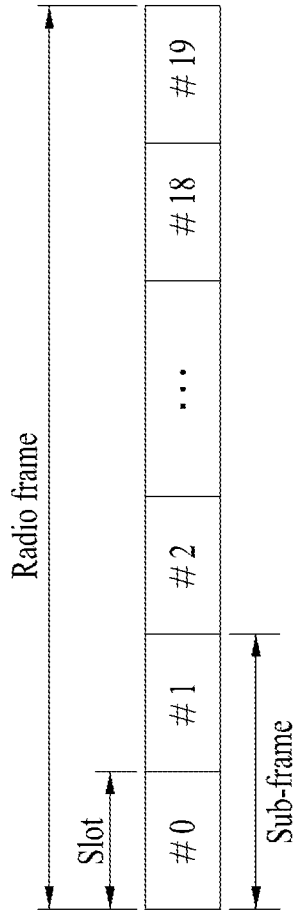
FIG. 1 is a diagram showing the structure of a radio frame.
Figure 1:
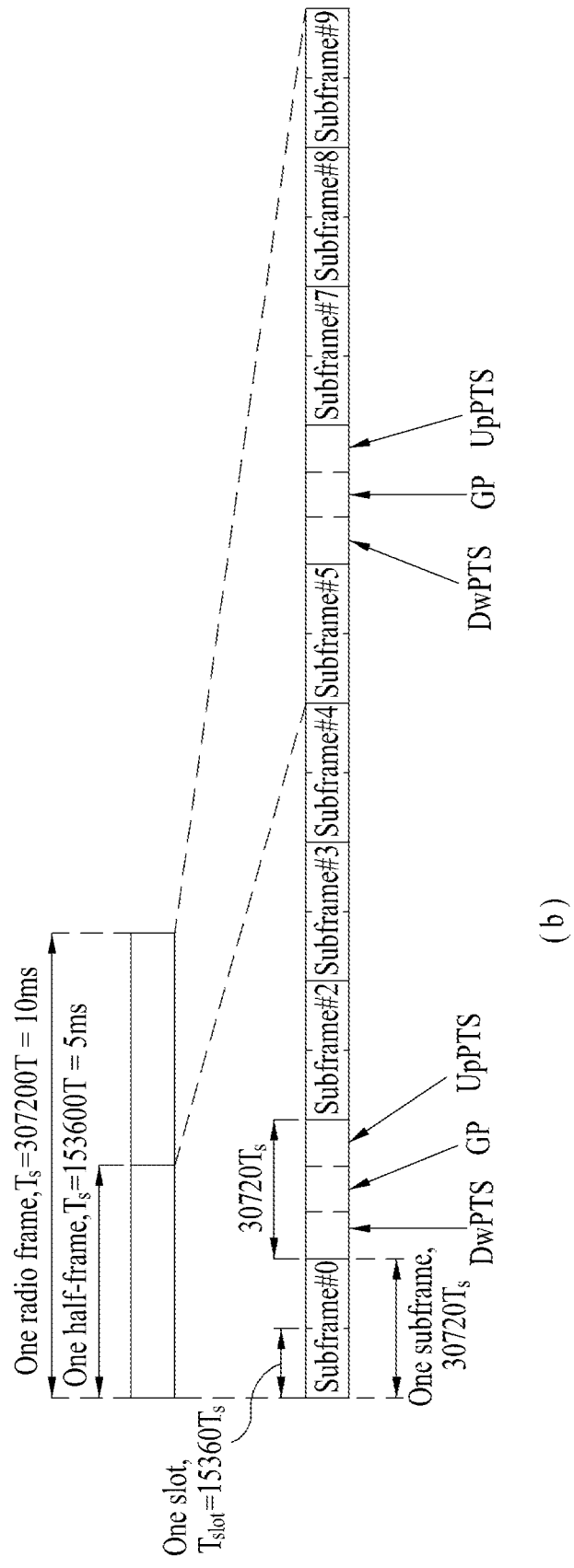

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems. Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
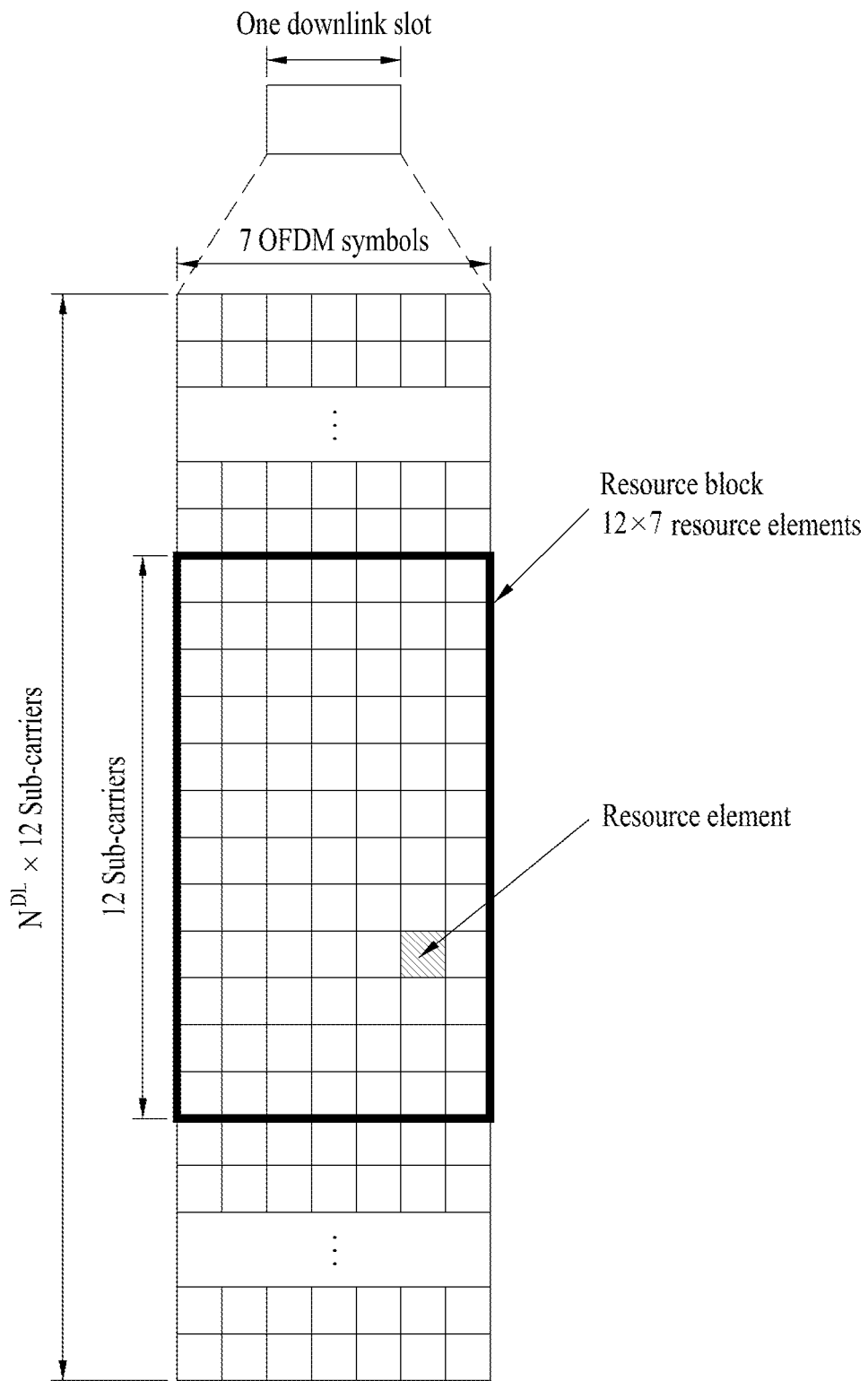
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
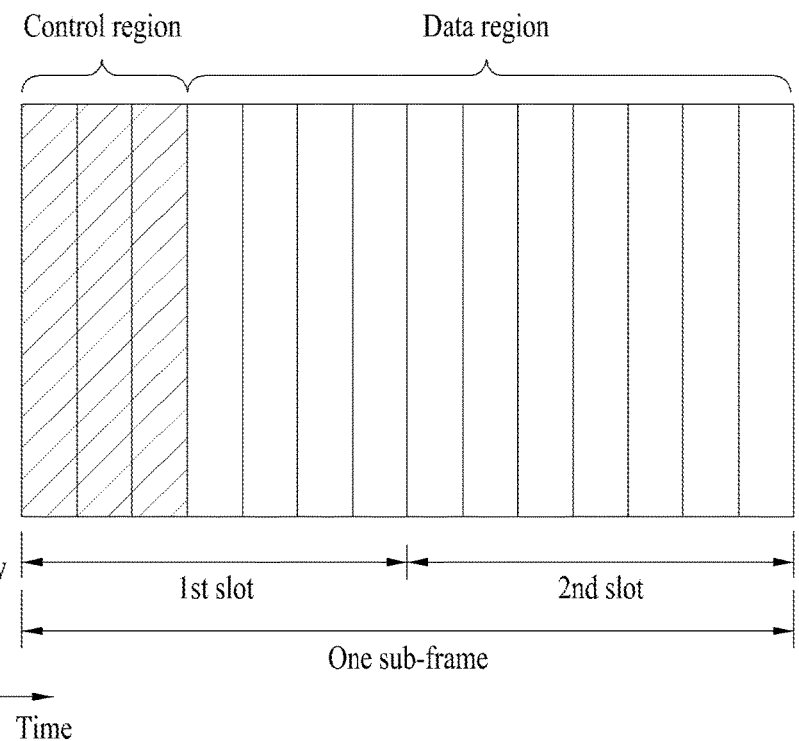
FIG. 3 is a diagram showing the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
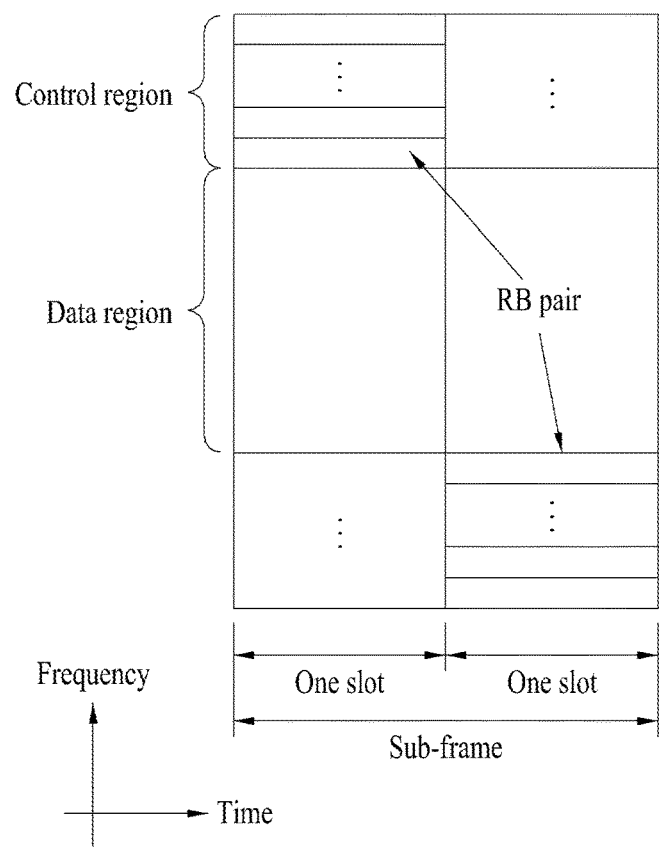
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
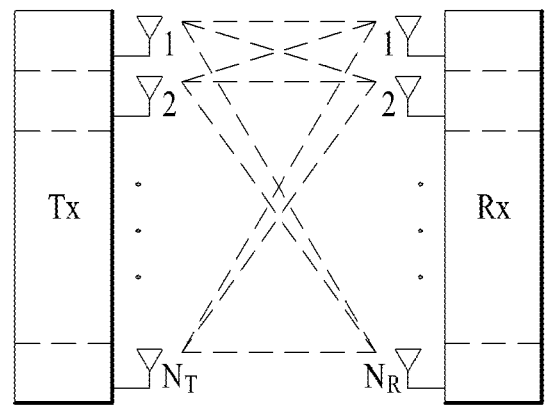
FIG. 5 is a diagram showing the configuration of a wireless communication system having multiple antennas.
Figure 5:
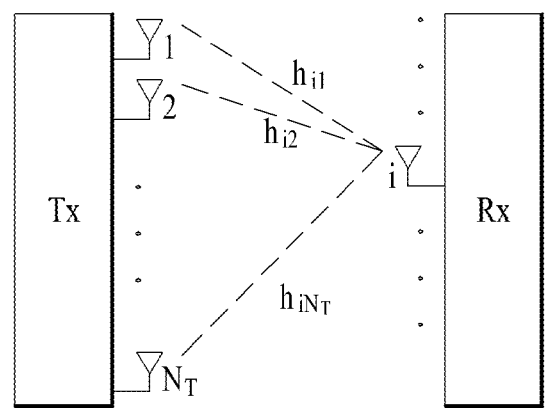

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots y_{N_R}$ of the antennas can be expressed as follows.

$$y = [y_1, y_2, \ldots, y_{N_R}]^T \qquad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \qquad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$ [Equation 8]

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

Synchronization Acquisition of D2D UE

Hereinafter, synchronization acquisition between UEs in D2D communication will be described based on the above description and a legacy LTE/LTE-A system. If time/frequency synchronization is not acquired in an OFDM system, multiplexing of OFDM signals of different UEs may be impossible due to inter-cell interference. For synchronization acquisition, it is not efficient for D2D UEs to directly transmit and receive synchronization signals such that all UEs individually acquire synchronization. Accordingly, in a distributed node system such as D2D, a specific node may transmit a representative synchronization signal and the remaining UEs may acquire synchronization. In other words, for D2D signal transmission and reception, some nodes (at this time, the node may be an eNB, a UE or a synchronization reference node (SRN) (or a synchronization source)) may periodically transmit D2D synchronization signals (D2DSSs) as synchronization sources and the remaining UEs may acquire synchronization and transmit and receive a signal.

A transmission period of the D2DSS is not less than 40 ms and one or more symbols of a subframe may be used to transmit the D2DSS.

The D2DSS may include a primary synchronization signal (a primary D2DSS (PD2DSS) or a primary sidelink synchronization signal (PSSS)) and a secondary synchronization signal (a secondary D2DSS (SD2DSS) or a secondary sidelink synchronization signal (SSSS)). The PD2DSS may have a similar/modified/repeated structure of a Zadoff-Chu sequence having a predetermined length or a PSS. The SD2DSS may have a similar/modified/repeated structure of an M-sequence or an SSS.

The same priority criterion should be applied in selection of a D2D UE as a D2D synchronization source. A UE in an out-of-coverage environment may become a synchronization source if the strengths of all received D2DSSs are equal to or less than a predetermined value. A UE in an in-coverage environment may be set as a synchronization source by an eNB. If UEs acquire synchronization from an eNB, a synchronization source may be the eNB and a D2DSS may be a PSS/SSS. The D2DSS of the synchronization source derived from the eNB may be different from the D2DSS of a synchronization source which is not derived from the eNB.

A physical D2D synchronization channel (PD2DSCH) may be a (broadcast) channel, through which base (system) information which should be known to a UE before D2D signal transmission and reception (e.g., information related to a D2DSS, a duplex mode (DM), a TDD UL/DL configuration, resource pool related information, the type of an application related to a D2DSS, etc.) is transmitted. The PD2DSCH may be transmitted on the same subframe as the D2DSS or a subsequent subframe thereof.

The D2DSS may be a specific sequence and the PD2DSCH may be a sequence indicating specific information or a codeword subjected to predetermined channel coding. Here, an SRN may be an eNB or a specific D2D UE. In the case of partial network coverage or out-of-network coverage, a UE may be a synchronization source.

Figure 6:
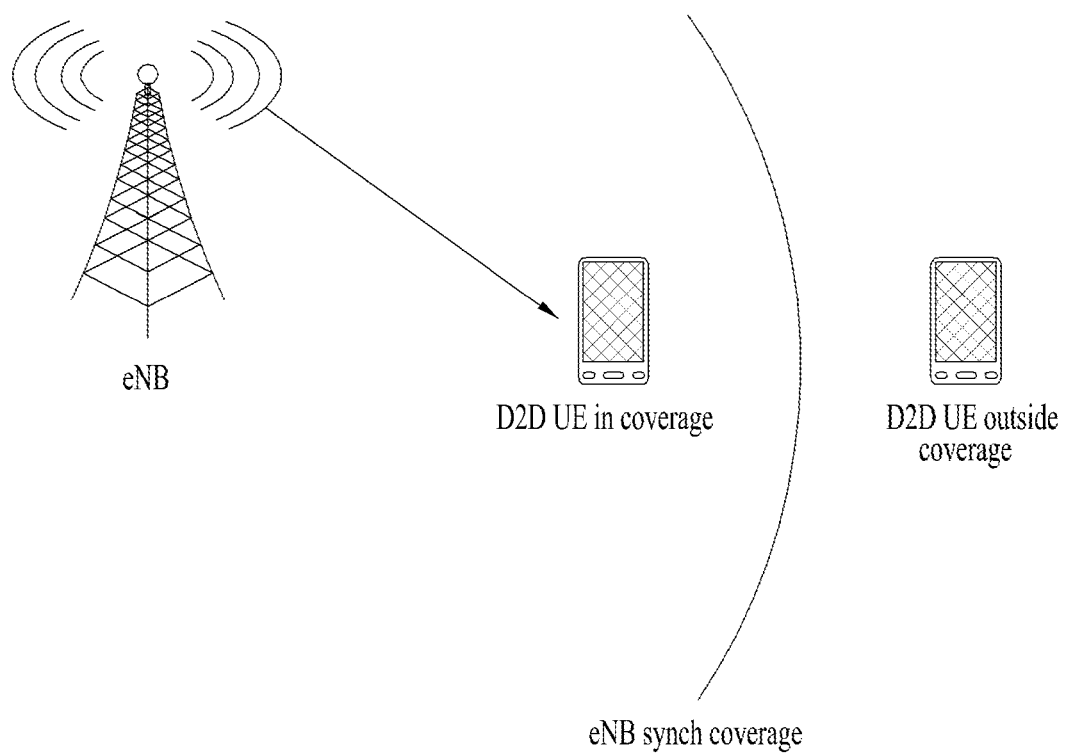
FIG. 6 is a diagram illustrating device-to-device (D2D) communication.

In a situation shown in FIG. 6, a D2DSS may be relayed for D2D communication with an out-of-coverage UE. In addition, the D2DSS may be relayed through multiple hops. In the following description, relaying a synchronization signal includes AF relaying of a synchronization signal by an eNB and transmission of a D2D synchronization signal of a special format at a synchronization signal reception time. By relaying of a D2D synchronization signal, an in-coverage UE and an out-of-coverage UE may directly perform communication.

Generation and Transmission of D2D Synchronization Signal

Hereinafter, a method of generating and transmitting a D2D synchronization signal and, more particularly, a secondary synchronization signal (SD2DSS) according to an embodiment of the present invention will be described.

The secondary synchronization signal is generated from a combination of two sequences. A method of combining the two sequences is changed according to a subframe index of a subframe in which the secondary synchronization signal is transmitted. More specifically, the secondary synchronization signal may be a concatenation of sequences having a length of 31 and the combination type thereof may be expressed by Equation 12 below.

$$d(2n) = \begin{cases} s_0^{(m_0)}(n)c_0(n) & \text{in subframe } 0 \\ s_1^{(m_1)}(n)c_0(n) & \text{in subframe } 5 \end{cases}$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

Equation 12

In the above Equation, $m_0$ and $m_1$ and are defined as follows:

$$m_0 = m' \bmod 31$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor,$$
$$q' = \lfloor N_{ID}^{(1)}/30 \rfloor$$

where, $N_{ID}^{(1)}$ denotes a physical cell identification group. In Equation 12, the two sequences $s_0^{(m_0)}(n)$ and $s_1^{(m_1)}(n)$ are expressed as shown in Equation 13 below by different cyclic shifts of an m-sequence.

$$s_0^{(m_0)}(n) = \tilde{s}((n+m_0) \bmod 31)$$

$$s_1^{(m_1)}(n) = \tilde{s}((n+m_1) \bmod 31)$$

Equation 13 where $\tilde{s}(i) = 1 - 2x(i)$, $0 \le i \le 30$, $x(\bar{i}+5) = (x(\bar{i}+2) + x(\bar{i})) \bmod 2, 0 \le \bar{i} \le 25,$ $x(0)=0, x(1)=0, x(2)=0, x(3)=0, x(4)=1$ As shown in Equations 12 and 13 above, different combination types of the two sequences are used in subframe 0 and subframe 5. If the secondary synchronization signal is generated by a UE, that is, if a D2D UE generates the secondary synchronization signal, the above-described methods are used. However, the subframe index determining the combination types may be regarded as being the same. That is, only the sequences used in subframe 0 (or 5) may be used. Alternatively, a subsequence having a good PAPR property (a sequence property corresponding thereto) per SSS sequence may be defined as a representative sequence. A specific subsequence among subsequences in each sequence of an SD2DSS (that is, a sequence used in subframe 0 of and a sequence used in subframe 5 of an existing SSS) may be selected as a representative sequence of the SD2DSS.

If the subframe index determining the combination types may be regarded as being the same, the generated secondary synchronization signal may be transmitted on contiguous symbols. That is, the generated sequences may be transmitted on contiguous SC-FDMA symbols of subframe 0.

As described above, by defining synchronization signal generation in D2D, PAPR problems may be solved. If one of two symbols of an SD2DSS uses the same sequence as an SSS transmitted on subframe 0 and the other symbol uses the same sequence as an SSS transmitted on subframe 5, the PAPR may be differently set according to the SD2DSS symbol transmitted from the same synchronization source and power backoff for compensating for the PAPR may be differently applied according to the SD2DSS symbol. Such a method may reduce SD2DSS detection performance and increase complexity of a UE when PD2DSCH demodulation is performed using the SD2DSS. Accordingly, as described above, by equally using the SD2DSS in each symbol, such problems can be solved.

The PAPR problems will now be described in detail. If a PD2DSS/SD2DSS is designed based on an existing PSS/SSS, the PD2DSS is configured based on a Zadoff-Chu (ZC) sequence used in the PSS and the SD2DSS is configured based on an M-sequence used in the SSS. In addition, the number of root indices of a sequence used in the PD2DSS may be relatively less than that of root indices of a sequence used in the SD2DSS. (In the same setting as an existing LTE PSS/SSS, the number of root indices of the PD2DSS may be set to 3 and the number of root indices of the SD2DSS may be set to 168.) At this time, since the number of possible sequences is small in the PD2DSS, when several UEs simultaneously transmit PD2DSSs, it is difficult for the UE to identify the PD2DSSs. In addition, the PD2DSS powers of the UEs are accumulated and thus PD2DSS receive power may be overestimated. In order to prevent such problems, a receiver may identify the signal strengths of the detected D2DSSs through an average of receive powers of the PD2DSS and the SD2DSS or separately set an identification criterion of each synchronization signal to identify signal strengths.

Figure 7:
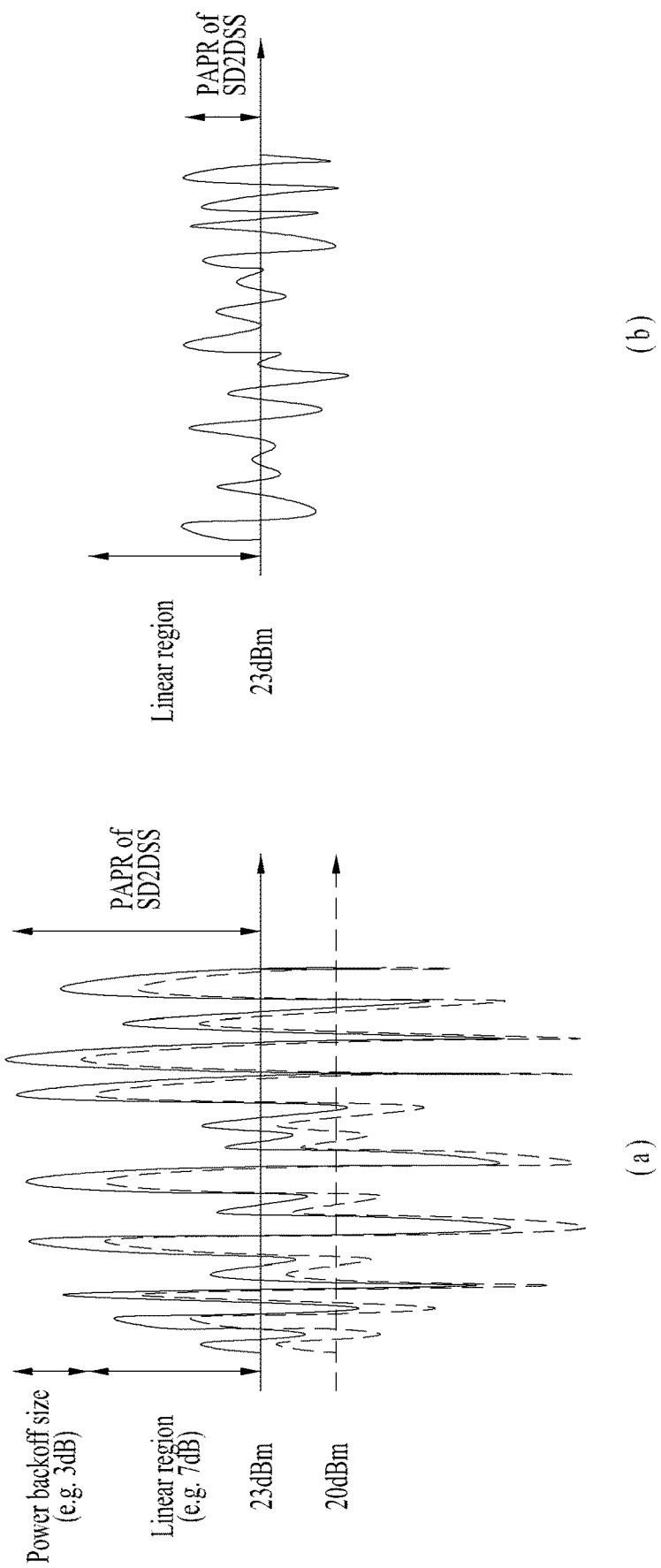
FIG. 7 is a diagram illustrating PAPR problems related to an embodiment of the present invention.

From the viewpoint of a transmitter, the M-sequence has a PAPR property greater than that of a ZC sequence, and the average transmit powers of the PD2DSS and the SD2DSS may be differently set according to amplification performance (e.g., a range capable of linearly amplifying a signal) of the transmitter. In this case, the coverage of the PD2DSS and the coverage of the SD2DSS may differ. Setting of different transmit powers of a PD2DSS and an SD2DSS according to PAPR property and a coverage difference will be described with reference to FIG. 7. FIGS. 7(a) and 7(b) show signal waveforms of an SD2DSS and a PD2DSS, respectively. Assume that an average of the powers of two sequences is 23 dBm (signal denoted by a solid line) and a maximum value of a signal which may be linearly amplified by a UE is 30 dB. In addition, assume that the PAPR (that is, a ratio of peak power to average power) of the SD2DSS is 10 dB and the PAPR of the PD2DSS is 3 dB. If the D2DSS is configured in this way, when the D2DSS is transmitted with the maximum (average) power of the UE, the PD2DSS may be transmitted without any problems. However, in the case of the SD2DSS, since a signal having instantaneous power of 30 dBm or more is distorted and transmitted, SD2DSS performance deteriorates. In order to solve such a problem, the average power of the SD2DSS may be reduced (such that the signal of the SD2DSS is not distorted). That is, as denoted by a dotted line of FIG. 7(a), if the average power of the SD2DSS is set to 20 dBm, SD2DSS transmission is possible without signal distortion of the SD2DSS. However, in this case, a difference in coverage between the PD2DSS and the SD2DSS may be generated due to a transmit power difference. This means that the PD2DSS may be detected but the SD2DSS may not be detected.

Hereinafter, in addition to the above-described synchronization signal generation method, the following methods of solving the PAPR problems will be described.

Power Reduction

Power reduction for a secondary synchronization signal may be considered. A D2D transmitter may select an SD2DSS sequence, apply power reduction defined for the sequence and transmit an SD2DSS. A D2D receiver may assume and apply power reduction defined for a detected SD2DSS sequence to a determination as to whether a synchronization source operates and PD2DSCH demodulation. Power reduction is applicable based on the maximum transmit power of the UE and is differently applicable according to UEs.

As a detailed reduction method, power reduction values of all possible sequences may be set. For a maximum of 1008 sequences, the power reduction value applied upon using each sequence may be predefined. Alternatively, power reduction is applicable per group. That is, the PAPRs of all sequences (or correlation with the PD2DSS and power amplification requirement) are pre-examined and sequences having similar properties may be grouped. Assume that the same power reduction is applicable to the sequences belonging to the same group. Alternatively, a specific power reduction value may be determined and applied to all sequences. The power reduction value may be determined according to PAPR property (or signal property corresponding thereto). For example, a power reduction value may be selected based on a sequence having the worst PAPR property (that is, a sequence having largest waveform fluctuation) or based on a PAPR average (or an intermediate value) of all sequences.

The power reduction value may be always or conditionally applied. Always applying the power reduction value may mean that D2DSS transmission is performed with maximum transmit power of a D2D UE. In contrast, conditionally applying the power reduction value may mean that the transmit power of a synchronization signal is less than maximum power and transmission is performed with the transmit power, a D2D UE may completely transmit/receive the PAPR of a selected SD2DSS sequence, a power reduction value less than a predetermined power reduction value is used, or power reduction is not performed. (Alternatively, if a linear region of power amplification includes the whole or a portion of a signal region of the SD2DSS sequence, a power reduction value may not be applied or a smaller power reduction value may be applied.) Additionally, if the signal region of the SD2DSS is greater than the linear region of the UE although the power reduction value defined by the following method is applied or if the UE cannot completely transmit the SD2DSS, transmission of the D2DSS may be dropped.

The power reduction value may be set based on the maximum transmit power of the D2D UE or the PD2DSS power. Alternatively, the maximum transmit power of the secondary synchronization signal may be determined by applying the maximum power reduction value for the secondary synchronization signal to the transmit power of the primary synchronization signal. For example, if the power reduction value is 3 dB and the maximum transmit power of the D2D UE is 23 dBm, the average power of the SD2DSS may be 20 dBm. Alternatively, if the transmit power of the PD2DSS is 20 dBm, the transmit power of the SD2DSS may be 17 dBm. Based on such a relationship, the D2D transmitter may set the transmit power of the PD2DSS/SD2DSS and the D2D receiver may assume a power reduction value defined for the detected sequence and perform reception operation.

Setting of Transmit Power of Synchronization Signal

The (average) transmit power of the PD2DSS may be set equally with the (average) transmit power of the SD2DSS. That is, power is controlled in order to adjust the coverage of the PD2DSS and the coverage of the SD2DSS to be equal. This means that the PD2DSS may not be transmitted with the maximum power of the UE according to the backoff size of the SD2DSS. That is, although higher power may be used, transmission should be performed with lower power.

A UE for transmitting a PD2DSS/SD2DSS may set average transmit power of the PD2DSS/SD2DSS according to the PAPR property of a (SD2DSS) sequence index selected thereby (or specified by a network). For example, if a sequence having a good PAPR property is selected from among SD2DSS sequences, the average power of the PD2DSS may be relatively less reduced to perform transmission. Referring to FIG. 7 again, in order to transmit the SD2DSS without distortion, the transmitter may transmit an SD2DSS with an average power of 20 dBm and transmit a PD2DSS with the same average power of 20 dBm. Such D2DSS power reduction may be differently applied according to UEs, which may mean a specific UE (e.g., a UE having a large linear region) may not perform power reduction. A UE, which has received the D2DSS, may measure receive power (e.g., the RSRPs of known signals (PD2DSS and SD2DSS)) at the resource with respect to the detected PD2DSS/SD2DSS pair and determine whether the UE becomes a synchronization source through comparison with a threshold (predefined or specified by higher layer signaling).

Definition of Linear Region of Transmitter

For example, if the linear region of a D2D UE (that is, a region in which a signal may be linearly amplified) is set to +5 dB as compared to a maximum power defined in a legacy LTE system, a UE, which has detected an SD2DSS sequence (group) having a PAPR property of 8 dB, may assume that the maximum power of the SD2DSS is set to (maximum power −3 dB) and apply a threshold less than the threshold of the PD2DSS by 3 dB. In this case, the transmission UE may determine the transmit powers of the PD2DSS and the SD2DSS based on a predefined value regardless of the linear region thereof and the predefined linear region may mean minimum requirement of the D2D UE amplification. At this time, the transmitter may perform transmission with allowed maximum power with respect to the PD2DSS/SD2DSS. (For example, in the above case, the PD2DSS may be transmitted with 23 dBm and the SD2DSS may be transmitted with 20 dBm capable of preventing signal distortion in consideration of PAPR.) The D2D receiver may determine a threshold for operation of a synchronization source in consideration of the detected SD2DSs sequence index and the predefined linear region.

Setting of Threshold at Receiver

A receiver may define a threshold of a PD2DSS and a threshold of an SD2DSS. For example, if the PD2DSS is transmitted with maximum power and the SD2DSS is transmitted with reduced power in order to prevent signal distortion, a lower threshold is applied to the SD2DSS. The threshold may be set to a specific value in advance or may be determined based on the PAPR property of the SD2DSS sequence detected by a reception UE (for example, a threshold may be predefined per sequence index (group)). (Alternatively, the threshold may be signaled by a network, a cluster header (synchronization header), etc.) If PD2DSSs are simultaneously received from a plurality of synchronization sources due to small root indices of the PD2DSS, it may be inadequate that a determination as to whether to operate as a synchronization source is made based on the signal quality of the PD2DSS. Accordingly, a determination as to whether to operate as a synchronization source may be made based on only the signal quality of the SD2DSS and only the threshold of the SD2DSS may be defined.

The above-described methods may be restricted to be applied to the case where the range of the signal waveform of the SD2DSS exceeds the linear region of the D2D UE power amplification. If the range of the signal waveform of the SD2DSS is distributed within the linear region, operation for performing SD2DSS power reduction and operation for setting different thresholds of the PD2DSS/SD2DSS may not be performed. To this end, information indicating whether one or more of the above-described methods is applied may be signaled. A D2D UE in network coverage may receive the information through higher layer signaling or a PD2DSCH. Alternatively, it may be predefined that power reduction is not performed in a specific PD2DSS root index, a specific SD2DSS root index or a combination of specific PD2DSS and SD2DSS.

In generation of the synchronization signal according to the embodiment of the present invention, a value $N_{ID}^{(2)}$ may be fixed regardless of the PD2DSS root index. More specifically, upon generating an existing synchronization signal, scrambling sequences $c_0(n)$ and $c_1(n)$ are defined as shown in Equation 14 below.

$$c_0(n) = \tilde{c}((n + N_{ID}^{(2)}) \bmod 31)$$

$$c_1(n) = \tilde{c}((n + N_{ID}^{(2)} + 3) \bmod 31) \quad \text{Equation 14}$$

where, $\tilde{c}(i) = 1 - 2x(i)$, $0 \leq i \leq 30$ is defined as $$x(\bar{i}+5) = (x(\bar{i}+3) + x(\bar{i})) \bmod 2, 0 \leq \bar{i} \leq 25$$

$(x(0)=0, x(1)=0, x(2)=0, x(3)=0, x(4)=1)$.

$N_{ID}^{(2)}$ is a parameter determined by a PSS root index and may be one of $\{0, 1, 2\}$ and $\{0,1,2\}$ may one-to-one correspond to a PSS root index $\{25,29,34\}$. Accordingly, if an SD2DSS is configured based on an SSS defined in legacy LTE, the property of a sequence may be changed by scrambling. In order to prevent this, upon generating the SD2DSS, the value $N_{ID}^{(2)}$ is fixed regardless of the PD2DSS root index. For example, the SD2DSS is generated using the same method as the existing SSS sequence but $N_{ID}^{(2)}$ may be fixed to 0 (or 1, 2 or M (an integer except for 0, 1 and 2)). Alternatively, in the above equation, $N_{ID}^{(2)}$ may be omitted or $c_0(n)$ and $c_1(n)$ may be omitted in a process of obtaining $d_1(n)$.

Similarly to $c(n)$, scrambling sequences $z_1^{(m_0)}(n)$ and $z_1^{(m_1)}(n)$ may also be omitted.

If the scrambling sequences are omitted, the SD2DSS may be defined as shown in Equation 15 or 16 below. (In the following equations, symbols x and y mean symbols to which the SD2DSS is mapped.)

$$d(2n) = \begin{cases} s_0^{(m_0)}(n) & \text{in symbol } x \\ s_1^{(m_1)}(n) & \text{in symbol } y \end{cases} \quad \text{Equation 15}$$

$$d(2n+1) = \begin{cases} s_1^{(m_1)}(n) & \text{in symbol } x \\ s_0^{(m_0)}(n) & \text{in symbol } y \end{cases}$$

$$d(2n) = \begin{cases} s_0^{(m_0)}(n) & \text{in symbol } x \\ s_1^{(m_1)}(n) & \text{in symbol } y \end{cases} \quad \text{Equation 16}$$

$$d(2n+1) = \begin{cases} s_1^{(m_1)}(n)z_1^{(m_0)}(n) & \text{in symbol } x \\ s_0^{(m_0)}(n)z_1^{(m_1)}(n) & \text{in symbol } y \end{cases}$$

Configuration of Apparatus According to Embodiment of the Present Invention

Figure 8:
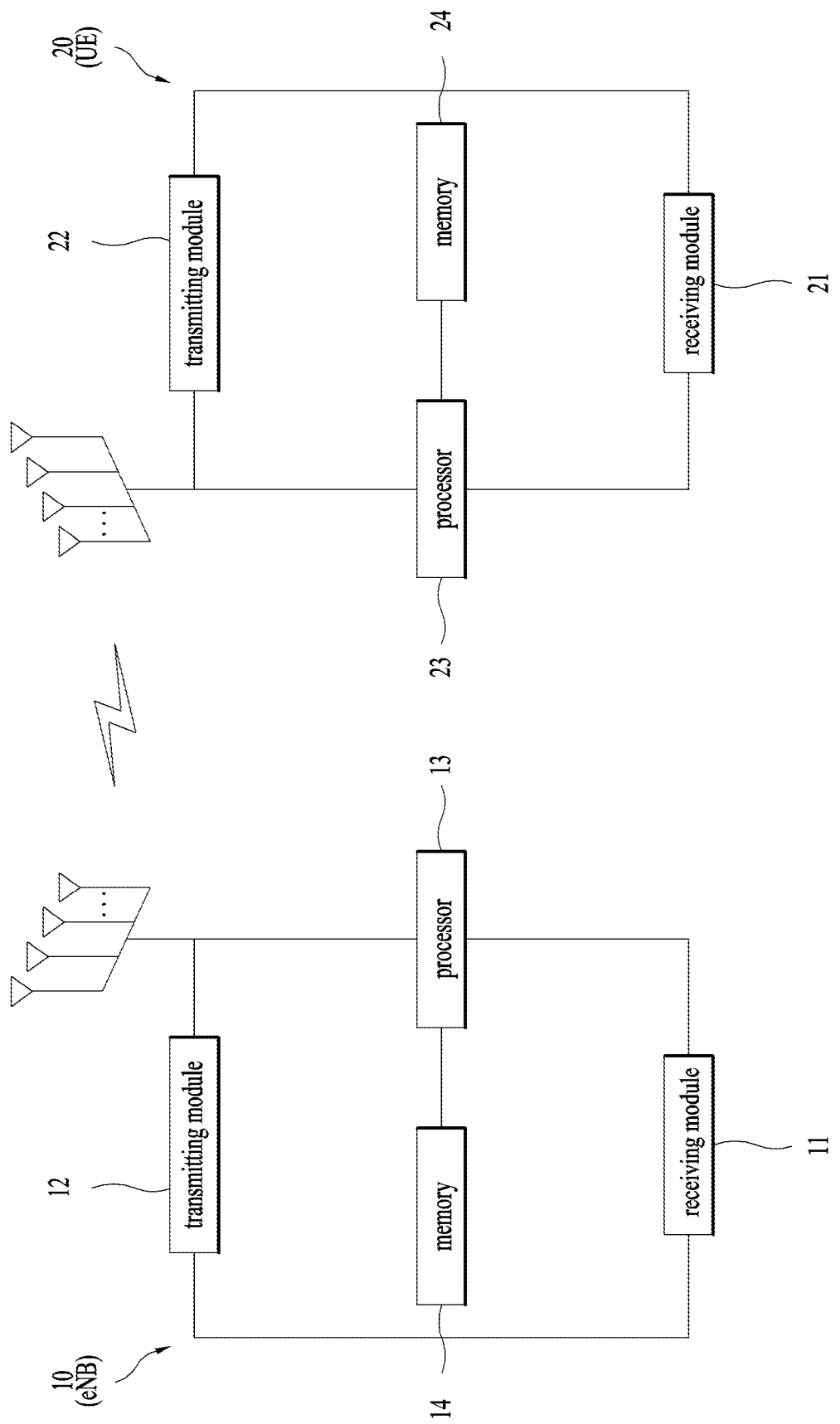
FIG. 8 is a diagram showing the configuration of transmission and reception apparatuses.

FIG. 8 is a diagram showing the configuration of a transmission point apparatus and a UE apparatus according to an embodiment of the present invention.

Referring to FIG. 8, the transmission point apparatus 10 according to the present invention may include a reception module 11, a transmission module 12, a processor 13, a memory 14 and a plurality of antennas 15. Since the plurality of antennas 15 is used, the transmission point apparatus may support MIMO transmission/reception. The reception module 11 may receive a variety of signals, data and information from the UE in uplink. The transmission module 12 may transmit a variety of signals, data and information to the UE in downlink. The processor 13 may control the overall operation of the transmission point apparatus 10.

The processor 13 of the transmission point apparatus 10 according to one embodiment of the present invention may process operations necessary for the embodiments.

The processor 13 of the transmission point apparatus 10 may process information received by the transmission point apparatus 10 and information to be transmitted to an external device and the memory 14 may store the processed information for a predetermined time and may be replaced by a component such as a buffer (not shown).

Referring to FIG. 8, the UE apparatus 20 according to the present invention may include a reception module 21, a transmission module 22, a processor 23, a memory 24 and a plurality of antennas 25. Since the plurality of antennas 25 is used, the UE apparatus may support MIMO transmission/reception. The reception module 25 may receive a variety of signals, data and information from the eNB in downlink. The transmission module 22 may transmit a variety of signals, data and information to the eNB in uplink. The processor 23 may control the overall operation of the UE apparatus 20.

The processor 23 of the UE apparatus 20 according to one embodiment of the present invention may process operations necessary for the embodiments.

The processor 23 of the UE apparatus 20 may process information received by the UE apparatus 20 and information to be transmitted to an external device and the memory 24 may store the processed information for a predetermined time and may be replaced by a component such as a buffer (not shown).

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity.

Furthermore, in the description of FIG. 8, the description of the transmission point apparatus 10 may also be equally applied to a device functioning as a downlink transmitter or an uplink receiver. The description of the UE apparatus 20 may also be equally applied to a relay station device functioning as an uplink transmitter or a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method of transmitting a synchronization signal, by a sidelink User Equipment (UE), in a wireless communication system, the method comprising:
generating a sidelink secondary synchronization signal by combining two sequences related to a specific subframe index regardless of a subframe index of one subframe in which the sidelink secondary synchronization signal is to be transmitted; and
transmitting the sidelink secondary synchronization signal via the one subframe,
wherein the specific subframe index is fixed to,
wherein the two sequences include a first length-31 binary sequence $d(2n)$ and a second length-31 binary sequence $d(2n+1)$, and
wherein the first length-31 binary sequence $d(2n)$ and the second length-31 binary sequence $d(2n+1)$ are defined based on the following equation $$d(2n)=S_1^{m1}(n)C_0(n)$$

$$d(2n+1)=S_0^{(m0)}(n)C_1(n)z_1^{(m1)}(n),$$

where $m_0$ and $m_1$ are derived from a physical-layer cell-identity group,
where $S_0^{(m0)}(n)$ and $S_1^{m1}(n)$ are m-sequences with different cyclic shifts, and
where each of $C_0(n)$ $C_1(n)$ and $z_1^{(m1)}(n)$ is a scrambling sequence.

2. The method according to claim 1, wherein the generated sidelink secondary synchronization signal is transmitted on contiguous symbols.

3. The method according to claim 1, wherein a maximum power reduction for the sidelink secondary synchronization signal is applied to transmission of the secondary synchronization signal generated by the sidelink UE.

4. The method according to claim 3, wherein a maximum transmit power of the sidelink secondary synchronization signal is determined by applying the maximum power reduction for the sidelink secondary synchronization signal to transmit power of a primary synchronization signal.

5. The method according to claim 3, wherein the power reduction is differently applied per UE.

6. A sidelink User Equipment (UE) apparatus for transmitting a synchronization signal in a wireless communication system, the sidelink UE apparatus comprising:
a transmission device; and
a processor,
wherein the processor generates a sidelink secondary synchronization signal by combining two sequences related to a specific subframe index regardless of a subframe index of one subframe in which the sidelink secondary synchronization signal is to be transmitted and transmits the sidelink secondary synchronization signal via the one subframe, and
wherein the specific subframe index is fixed to a subframe index 5,
wherein the two sequences include a first length-31 binary sequence $d(2n)$ and a second length-31 binary sequence $d(2n+1)$, and
wherein the first length-31 binary sequence $d(2n)$ and the second length-31 binary sequence $d(2n+1)$ are defined based on the following equation $$d(2n)=S_1^{m1}(n)C_0(n)$$

$$d(2n+1)=S_0^{(m0)}(n)C_1(n)z_1^{(m1)}(n),$$

where $m_0$ and $m_1$ are derived from a physical-layer cell-identity group,
where $S_0^{(m0)}(n)$ and $S_1^{m1}(n)$ are m-sequences with different cyclic shifts, and
where each of $C_0(n)$, $C_1(n)$ and $z_1^{(m1)}(n)$ is a scrambling sequence.

7. The sidelink UE apparatus according to claim 6, wherein the generated sidelink secondary synchronization signal is transmitted on contiguous symbols.

8. The sidelink UE apparatus according to claim 6, wherein a maximum power reduction for the sidelink secondary synchronization signal is applied to transmission of the sidelink secondary synchronization signal generated by the sidelink UE apparatus.

9. The sidelink UE apparatus according to claim 8, wherein a maximum transmit power of the sidelink secondary synchronization signal is determined by applying the maximum power reduction for the sidelink secondary synchronization signal to transmit power of a primary synchronization signal.

10. The sidelink UE apparatus according to claim 8, wherein the power reduction is differently applied per UE.

11. The method according to claim 1, wherein the subframe index of the one subframe is 0 or 5.

* * * * *